(12) United States Patent
Solheim

(10) Patent No.: US 11,110,329 B2
(45) Date of Patent: *Sep. 7, 2021

(54) GOLF CLUB HEAD WITH GROOVES AND METHOD OF MANUFACTURE

(71) Applicant: KARSTEN MANUFACTURING CORPORATION, Phoenix, AZ (US)

(72) Inventor: John A. Solheim, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,817

(22) Filed: Jul. 26, 2019

(65) Prior Publication Data

US 2019/0344133 A1 Nov. 14, 2019

Related U.S. Application Data

(60) Continuation of application No. 16/027,126, filed on Jul. 3, 2018, now Pat. No. 10,406,411, which is a continuation of application No. 15/018,295, filed on Feb. 8, 2016, now Pat. No. 10,039,962, which is a continuation of application No. 14/695,389, filed on Apr. 24, 2015, now Pat. No. 9,272,374, which is a continuation of application No. 13/759,864, filed on (Continued)

(51) Int. Cl.

| | |
|---|---|
| *A63B 53/04* | (2015.01) |
| *B23P 11/00* | (2006.01) |
| *B23P 11/02* | (2006.01) |
| *B23P 17/04* | (2006.01) |

(52) U.S. Cl.
CPC ............ *A63B 53/047* (2013.01); *B23P 11/00* (2013.01); *B23P 11/025* (2013.01); *B23P 17/04* (2013.01); *A63B 53/0416* (2020.08);

*A63B 53/0445* (2020.08); *A63B 2209/00* (2013.01); *Y10T 29/4997* (2015.01); *Y10T 29/49826* (2015.01); *Y10T 29/49865* (2015.01); *Y10T 29/49885* (2015.01); *Y10T 29/49989* (2015.01); *Y10T 29/49995* (2015.01)

(58) Field of Classification Search
CPC .............. A63B 53/047; A63B 2209/00; A63B 53/0416; A63B 53/0445
USPC .................................. 473/324–350, 287–292
See application file for complete search history.

(56) References Cited

U.S. PATENT DOCUMENTS

| | | |
|---|---|---|
| 1,543,691 A | 6/1925 | Beat |
| 2,034,936 A | 3/1936 | Barnhart |
| (Continued) | | |

OTHER PUBLICATIONS

Archenback, Smaller grooves, less spin, many questions, 1 page. Aug. 16, 2008.

(Continued)

*Primary Examiner* — Sebastiano Passaniti

(57) ABSTRACT

Embodiments of golf clubs with grooves and methods of manufacture thereof are described herein. In one embodiment of a golf club described herein, the golf club has a head with a body. The body has a strike face with channels and at least one insert located within at least one of the channels. At least one of the channels comprises a single groove, and the insert forms at least a portion of the single groove. At least one of the channels comprises an opening on the strike face that is narrower than a bottom of the at least one of the channels. Other embodiments and related methods are also disclosed herein.

16 Claims, 4 Drawing Sheets

Related U.S. Application Data

Feb. 5, 2013, now Pat. No. 9,015,918, which is a division of application No. 13/440,218, filed on Apr. 5, 2012, now Pat. No. 8,382,608, which is a continuation of application No. 13/045,178, filed on Mar. 10, 2011, now Pat. No. 8,172,698, which is a continuation of application No. 12/263,241, filed on Oct. 31, 2008, now Pat. No. 7,927,230.

(56) References Cited

U.S. PATENT DOCUMENTS

| | | | |
|---|---|---|---|
| 4,529,203 A | 7/1985 | Ribaudo | |
| 4,681,322 A | 7/1987 | Straza | |
| 4,768,787 A | 9/1988 | Shira | |
| 4,792,140 A | 12/1988 | Yamaguchi | |
| 5,100,144 A | 3/1992 | Okumoto | |
| 5,198,062 A | 3/1993 | Chen | |
| 5,358,249 A | 10/1994 | Mendralla | |
| 5,531,439 A | 7/1996 | Azzarella | |
| 5,564,705 A | 10/1996 | Kobayashi | |
| 5,586,947 A | 12/1996 | Hutin | |
| 5,688,186 A | 11/1997 | Michaels | |
| 5,755,626 A | 5/1998 | Shira | |
| 5,766,093 A | 6/1998 | Rohrer | |
| 5,879,243 A | 3/1999 | Hackman | |
| 6,042,486 A | 3/2000 | Gallagher | |
| 6,334,818 B1 | 1/2002 | Cameron | |
| 6,431,997 B1 | 8/2002 | Rohrer | |
| 6,723,279 B1 | 4/2004 | Withers et al. | |
| 6,733,400 B2 | 5/2004 | Sherwood | |
| 6,849,004 B2 | 2/2005 | Lindsay | |
| 6,913,545 B2 | 7/2005 | Jones | |
| 7,056,226 B2 | 6/2006 | Kennedy | |
| 7,261,644 B2 | 8/2007 | Burrows | |
| 7,275,999 B2 | 10/2007 | Sherwood | |
| 7,364,513 B2 | 4/2008 | Krumme | |
| 7,465,240 B2 | 12/2008 | Frame | |
| 7,585,232 B2 | 9/2009 | Krumme | |
| 7,594,862 B2 | 9/2009 | Gilbert | |
| 7,594,863 B2 | 9/2009 | Ban | |
| 7,717,801 B2 | 5/2010 | Franklin | |
| 7,794,333 B2 | 9/2010 | Wallans | |
| 7,811,180 B2 | 10/2010 | Roach | |
| 7,819,756 B2 | 10/2010 | Ban | |
| 7,841,952 B1 | 11/2010 | Oldknow et al. | |
| 7,846,039 B2 * | 12/2010 | Gilbert | A63B 60/00 473/331 |
| 7,927,230 B2 * | 4/2011 | Solheim | A63B 53/047 473/329 |
| 8,070,624 B2 * | 12/2011 | Oldknow | A63B 53/047 473/329 |
| 8,172,698 B2 * | 5/2012 | Solheim | A63B 53/047 473/329 |
| 8,172,699 B2 | 5/2012 | Nakamura | |
| 8,282,505 B2 | 10/2012 | Solheim | |
| 8,382,608 B2 * | 2/2013 | Solheim | B23P 11/00 473/329 |
| 8,585,513 B2 * | 11/2013 | Ban | A63B 53/047 473/331 |
| 9,011,268 B2 | 4/2015 | Ban | |
| 9,015,918 B2 * | 4/2015 | Solheim | B23P 17/04 29/447 |
| 9,033,820 B2 | 5/2015 | Kato | |
| 9,272,374 B2 * | 3/2016 | Solheim | B23P 11/00 |
| 10,039,962 B2 * | 8/2018 | Solheim | A63B 53/047 |
| 10,406,411 B2 * | 9/2019 | Solheim | B23P 11/025 |
| 2002/0025861 A1 | 2/2002 | Ezawa | |
| 2005/0009623 A1 | 1/2005 | Dickinson | |
| 2005/0009631 A1 | 1/2005 | Krumme | |
| 2007/0243949 A1 | 10/2007 | Solari | |
| 2008/0293511 A1 * | 11/2008 | Gilbert | A63B 53/047 473/331 |
| 2010/0279791 A1 * | 11/2010 | Park | A63B 53/047 473/331 |

OTHER PUBLICATIONS

Schupak, Golfweek, Clubmakers gear up for new era of grooves, 1 page. Aug. 16, 2008.

United States Golf Association, Notice to Manufacturers, New Groove Regulations, 3 pages. Aug. 5, 2008.

Determination of Groove Conformance, Impact Area Marking (App. II, 5c) Measurement Procedure, 9 pages. Aug. 2008.

* cited by examiner

GOLF CLUB HEAD WITH GROOVES AND METHOD OF MANUFACTURE

CROSS-REFERENCE TO RELATED APPLICATIONS

This is a continuation of U.S. patent application Ser. No. 16/027,126, filed Jul. 3, 2018, which is a continuation of U.S. patent application Ser. No. 15/018,295, filed Feb. 8, 2016, now U.S. Pat. No. 10,039,962, issued on Aug. 7, 2018, which is a continuation of U.S. patent application Ser. No. 14/695,389, filed on Apr. 24, 2015, now U.S. Pat. No. 9,272,374, which is a continuation of U.S. patent application Ser. No. 13/759,864, filed on Feb. 5, 2013, now U.S. Pat. No. 9,015,918, issued on Apr. 28, 2015, which is a division of U.S. patent application Ser. No. 13/440,218, filed Apr. 5, 2012, now U.S. Pat. No. 8,382,608, issued on Feb. 26, 2013, which is a continuation of U.S. patent application Ser. No. 13/045,178, filed on Mar. 10, 2011, now U.S. Pat. No. 8,172,698, issued on May 8, 2012, which is a continuation U.S. patent application Ser. No. 12/263,241, filed on Oct. 31, 2008, now U.S. Pat. No. 7,927,230, issued on Apr. 19, 2011, all of which are incorporated herein by reference.

TECHNICAL FIELD

This disclosure relates generally to golf equipment and relates more particularly to golf clubs having grooves and methods of manufacture.

BACKGROUND

Typically, a golf club head can include a club face with a plurality of parallel grooves extending between a toe end and a heel end of the club face. In particular, the plurality of grooves in an iron-type club head can "channel out" water, sand, grass, and/or other debris that may come between a golf ball and the club face. In some situations, this "channeling" can improve the grip between the golf ball and the club face. The grooves can have various cross-sectional shapes such as a square or rectangular shape, a V-shape, or a U shape.

BRIEF DESCRIPTION OF THE DRAWINGS

FIG. 18 depicts a cross-sectional view of an insert for the channel of FIG. 17;

Figure 1:
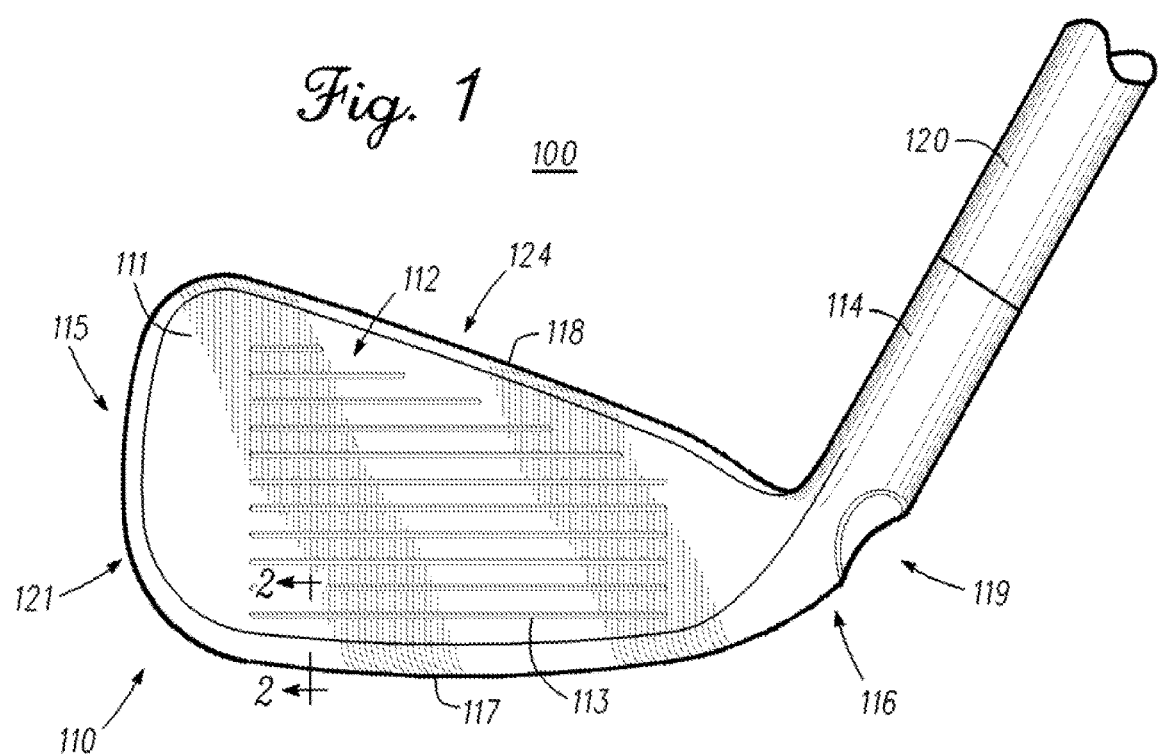
FIG. 1 depicts a front view of a golf club having a golf club head and a shaft, according to a first embodiment.

For simplicity and clarity of illustration, the drawing figures illustrate the general manner of construction, and descriptions and details of well-known features and techniques may be omitted to avoid unnecessarily obscuring of the drawings. Additionally, elements in the drawing figures are not necessarily drawn to scale. For example, the dimensions of some of the elements in the figures may be exaggerated relative to other elements to help improve understanding of different embodiments. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the golf club attachment mechanism and related methods described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the golf club attachment mechanism and related methods described herein are, for example, capable of operation in other orientations than those illustrated or otherwise described herein.

DESCRIPTION

In one embodiment, a golf club head includes: a body having a strike face with channels; and at least one insert located within at least one of the channels. In this embodiment, the channel in which the insert is located has a groove, and the insert forms at least a portion of the groove. Other examples, embodiments, and related methods are further described below.

Turning now to the figures, FIG. 1 depicts a front view of golf club 100, according to a first embodiment. Golf club 100 can be an iron-type golf club head, such as a 1-iron, a 2-iron, a 3-iron, a 4-iron, a 5-iron, a 6-iron, a 7-iron, an 8-iron, a 9-iron, a sand wedge, a lob wedge, a pitching wedge, an n-degree wedge (e.g., 44 degrees (°), 48°, 52°, 56°, 60°, etc.), etc. In a different embodiment, golf club 100 can also be a wood-type golf club, a hybrid-type golf club, or a putter-type golf club.

Golf club 100 includes golf club head body 110 and shaft 120 coupled to golf club head body 110. In the illustrated embodiment of FIG. 1, golf club head body 110 includes hosel 114 to which shaft 120 is coupled. In a different embodiment, golf club head body 110 has a hole, instead of hosel 114, to which shaft 120 is coupled.

Golf club head body 110 includes toe portion 115 and heel portion 116, where hosel 114 is located at heel portion 116. Golf club head body 110 also includes a perimeter 121 comprising sole 117 at a bottom portion of golf club head body 110 and also comprising top rail 118 at a top portion of golf club head body 110. Golf club head body 110 can also include notch 119 at heel portion 116.

Golf club head body 110 further includes back face 124 and front face 111 opposite back face 124. Front face 111 can also be referred to as a strike face. The strike face can be an integral part of golf club head body 110, or the strike face can be a separate piece from, or an insert for, golf club head body 110. The strike face includes one or more grooves 112, including groove 113. Grooves 112 can extend across the strike face from toe portion 115 of golf club head body 110 to heel portion 116 of golf club head body 110. Grooves 112 can also be stacked vertically above one another from sole 117 to top rail 118, as illustrated in FIG. 1.

As explained in more detail in the subsequent figures, the strike face includes channels and inserts located within the channels. In one embodiment, the inserts define grooves 112, and in a different embodiment, the channels and inserts define different portions of grooves 112.

Figure 3:
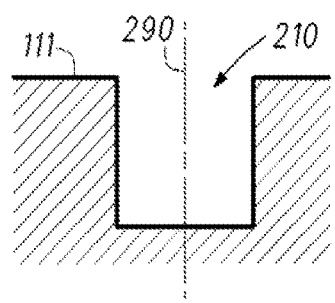
FIG. 3 depicts a cross-sectional view of the channel of FIG. 2.
Figure 2:
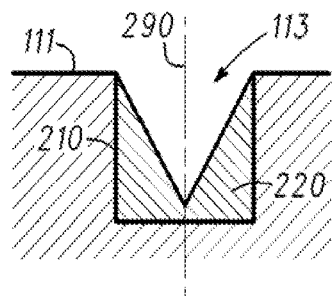
FIG. 2 depicts a cross-sectional view of a groove of the golf club head of FIG. 1, taken along a section line 2-2 in FIG. 1, where the cross-sectional view shows a channel of the golf club head and an insert.
Figure 4:
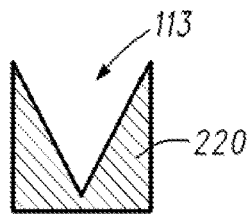
FIG. 4 depicts a cross-sectional view of the insert of FIG. 2.

FIG. 2 depicts a cross-sectional view of groove 113 of golf club head body 110 of FIG. 1, taken along a section line 2-2 in FIG. 1. As depicted in FIG. 2, golf club head body 110 incudes a channel 210 that is formed in a strike face or front face 111, and insert 220 is located entirely within channel 210. FIG. 3 depicts a cross-sectional view of channel 210, and FIG. 4 depicts a cross-sectional view of insert 220. The cross-sections of FIGS. 2-4 are taken along the widths of groove 113, channel 210, and insert 220. Insert 220 can extend along the entire length of channel 210.

Grooves 112 (FIG. 1), including groove 113 (FIGS. 1, 2, and 4) can be compliant or non-compliant with, for example, the regulations regarding grooves that were adopted by the United States Golf Association (USGA) on Aug. 5, 2008. As an example, when compliant with these regulations, grooves 112, including groove 113: (1) are straight and parallel with each other; (2) have a symmetrical cross-section and have sidewalls that do not converge toward the groove opening; (3) have a width, spacing, and cross-section that is consistent throughout the impact area of front face 111; (4) have a width that does not exceed 0.940 millimeters (mm) using the USGA's thirty degree method of measurement, and where less than half of the widths of grooves 112 exceed 0.889 mm using the same measurement technique; (5) have a distance between adjacent grooves that is not less than three times the maximum width of the adjacent grooves minus 0.203 mm and that is not less than 1.854 mm, and where less than half of the distances between adjacent ones of grooves 112 are less than three times the maximum width of the adjacent grooves and are less than 1.905 mm; (6) have a depth that does not exceed 0.559 mm, and where less than half of the depths of grooves 112 exceed 0.508 mm; (7) have a cross-sectional area divided by a groove pitch (i.e., groove width plus spacing between adjacent grooves) that does not exceed 0.081 mm, and where the less than half of the cross-sectional areas divided by the respective groove pitches exceed 0.076 mm; (8) have a range of widths that do not exceed 0.254 mm; and (9) have a range of depths that do not exceed 0.254 mm. Additional details regarding grooves 112 are explained in the subsequent figures.

In the embodiment illustrated in FIG. 2, insert 220 is located at and below front face 111 and is not located above front face 111. In one example of this embodiment, insert 220 can be located substantially planar to front face 111. Also in this embodiment, insert 220 can form a portion of front face 111, or insert 220 can be devoid of forming a portion of front face 111. Furthermore, in this embodiment, the radius of the edge of the groove can be formed entirely by insert 220, or the radius of the edge of the groove can be formed partially by front face 111 and partially by insert 220. In another embodiment, insert 220 can be located above and below front face 111. In a different embodiment, insert 220 is located only below front face 111. In this different embodiment, the radius of the edge of the groove can be formed entirely by front face 111, or the radius of the edge of the groove can be formed partially by front face 111 and partially by insert 220.

In one embodiment, each of grooves 112 (FIG. 1) is formed by a separate pair of channel 210 and insert 220. In this embodiment, each channel 210 has a single one of insert 220 and grooves 112 (FIG. 1), and each insert 220 forms at least a portion of each of grooves 112. In a different embodiment, golf club head body 110 (FIG. 1) has at least one channel, similar to channel 210, and at least one insert, similar to insert 220, is located within the at least one channel. In this different embodiment, the at least one channel has a single groove, similar to grooves 113. In another embodiment, golf club head body 110 (FIG. 1) has channels, similar to channel 210; a first insert, similar to insert 220, located within a first one of the channels; and a second insert, similar to insert 220, located within a second one of the channels. In this embodiment, each of the first and second ones of the channels has a single groove. Also, the first insert forms the single groove in the first one of the channels, and the second insert forms the single groove in the second one of the channels.

As illustrated in FIGS. 2-4, groove 113 is symmetrical about axis 290, which is an axis that is substantially perpendicular to the widths of groove 113, channel 210, and insert 220. In this embodiment, channel 210 and insert 220 are also symmetrical about axis 290. In other embodiments, some of which are illustrated in subsequent figures, one or more of channel 210 and insert 220 are asymmetrical about axis 290 while groove 113 is symmetrical about axis 290.

Similarly, as illustrated in FIGS. 2 and 4, groove 113 comprises a first cross section across a width of groove 113, and as illustrated in FIGS. 2 and 3, channel 210 comprises a second cross section across a width of channel 210 that is non-proportional to the first cross section. In other embodiments, some of which are illustrated in subsequent figures, the second cross section can be proportional to the first cross section.

In addition to the first cross section of groove 113 and the second cross section of channel 210, insert 220 comprises a third cross section across a width of insert 220, as illustrated in FIGS. 2 and 4. Each of these three cross sections comprises a cross-sectional area. In the embodiment of FIGS. 2-4, the cross-sectional area of the second cross section of channel 210 is approximately equal to a sum of the cross-sectional areas of the first and third cross sections of groove 113 and insert 220, respectively. In this embodiment, insert 220 can be secured within channel 210 by a friction fit. In some embodiments, an adhesive is disposed within channel 210 to further secure insert 220 within channel 210. As an example, the adhesive can comprise Loctite® adhesives (from Henkel Corporation in Gulph Mills, Pa.), epoxies, and other types of adhesives. When an adhesive is used within channel 210, insert 220 does not need to have a friction fit with channel 210. Accordingly, in some embodiments, no adhesive is used within channel 210 when insert 220 is secured within channel 210 by a friction fit. In other embodiments, where insert 220 does not have a friction fit with channel 210, an adhesive is used within channel 210.

In a different embodiment illustrated in a subsequent figure, the cross-sectional area of the cross section of the channel (e.g., channel 1110 in FIGS. 11 and 14) is greater than a sum of the cross-sectional areas of the first and third cross sections of groove 113 and insert 220, respectively. In this different embodiment, a greater amount of adhesive can be used within the channel than for channel 210 to improve the coupling between the channel and insert 220.

As illustrated in FIGS. 2 and 4, insert 220 is a single or unitary piece. In other embodiments, some of which are illustrated in the subsequent figures, the insert can include two or more pieces. In the same or different embodiment, some of the channels in a golf club head body can have inserts while other channels in the golf club head body do not have any inserts. Also, for the channels that do have one or more inserts, some of the channels can have a different number of inserts or a different type or shape of insert than other channels, or each of the channels that have inserts can have the same insert(s).

As also illustrated in FIGS. 2 and 4, insert 220 can form all of groove 113. In other embodiments, some of which are illustrated in the subsequent figures, the insert can form part of the groove, and the channel can form a different part of the groove.

In some embodiments, insert 220 can be referred to as a preform because insert 220 is formed before being inserted into channel 210. In the same or different embodiment, groove 113 can be formed into the preform or insert 220 before or after forming the preform or insert 220 and also before or after inserting the preform or insert 220 into channel 210. In some embodiments, insert 220 can have more than one groove, and different inserts of a golf club head can have a different number of grooves.

Regardless of whether the strike face of golf club head body 110 (FIG. 1) is integral with or a separate piece from golf club head body 110, the strike face can comprise a first material such as stainless steel, titanium, graphite, a composite of metallic and non-metallic materials, and the like. In some embodiments, insert 220 also comprises the first material, but in other embodiments, insert 220 comprises a second material different from the first material. As an example, the second material can be softer than, harder than, or the same hardness as the first material. In one embodiment illustrated in a subsequent figure (e.g., FIG. 27), the second material wears faster than the first material. Examples of the second material include aluminum, a resin, a plastic, titanium, a different grade of stainless steel than used for the first material, a composite, and the like. In one embodiment, the first material comprises a first grade of stainless steel, and the second material comprises a second grade of stainless steel that is more easily machined and/or extruded than the first grade of stainless steel. In another embodiment, the second material comprises a tacky or sticky material.

In some embodiments, insert 220 is not permanent and can be replaceable so that new inserts and/or different inserts can be placed into the channels. In other embodiments, insert 220 is permanently affixed within channel 210.

Figure 5:
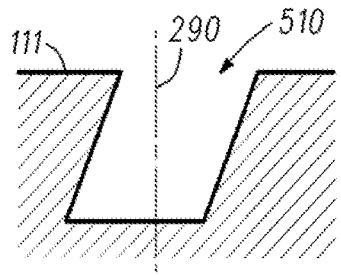
FIG. 5 depicts a cross-sectional view of a channel of a golf club head, according to a second embodiment.
Figure 6:
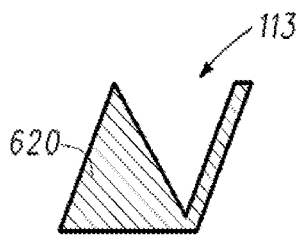
FIG. 6 depicts a cross-sectional view of an insert for the channel of FIG. 5.
Figure 7:
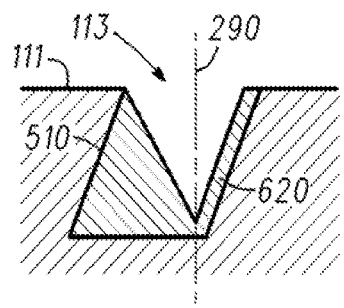
FIG. 7 depicts a cross-sectional view of the insert of FIG. 6 located within the channel of FIG. 5.

Turning to the next illustrated embodiment, FIG. 5 depicts a cross-sectional view of channel 510 of a golf club head, and FIG. 6 depicts a cross-sectional view of insert 620. FIG. 7 depicts a cross-sectional view of insert 620 located within channel 510. This illustrated embodiment is similar to the embodiment illustrated at FIGS. 2-4, but in the embodiment of FIGS. 5-7, channel 510 and insert 620 are asymmetric about axis 290 while groove 113 is symmetric about axis 290.

Figure 8:
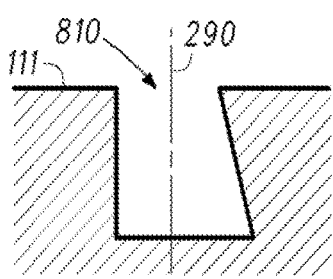
FIG. 8 depicts a cross-sectional view of a channel of a golf club head, according to a third embodiment.
Figure 9:
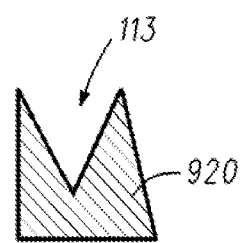
FIG. 9 depicts a cross-sectional view of an insert for the channel of FIG. 8.
Figure 10:
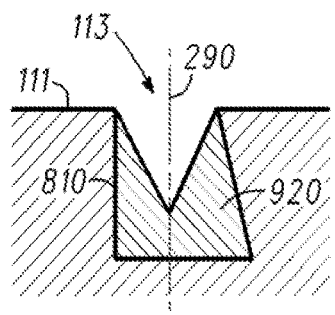
FIG. 10 depicts a cross-sectional view of the insert of FIG. 9 located within the channel of FIG. 8.

In another illustrated embodiment, FIG. 8 depicts a cross-sectional view of channel 810 of a golf club head, and FIG. 9 depicts a cross-sectional view of insert 920. FIG. 10 depicts a cross-sectional view of insert 920 located within channel 810. This embodiment is similar to the embodiment of FIGS. 2-4, but in the embodiment of FIGS. 8-10, channel 810 and insert 920 are asymmetric about axis 290 while groove 113 is symmetric about axis 290.

Figure 11:
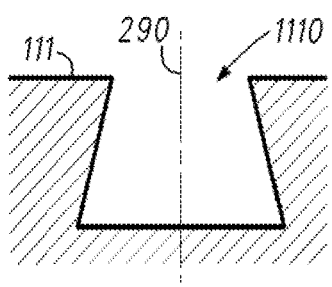
FIG. 11 depicts a cross-sectional view of a channel of a golf club head, according to a fourth embodiment.
Figure 12:
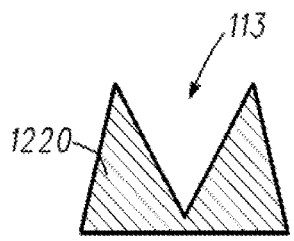
FIG. 12 depicts a cross-sectional view of an insert for the channel of FIG. 11.
Figure 13:
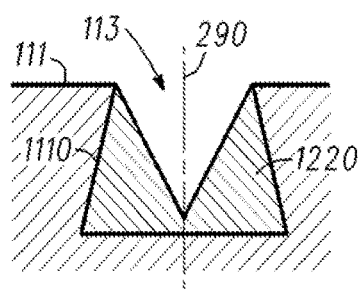
FIG. 13 depicts a cross-sectional view of the insert of FIG. 12 located within the channel of FIG. 11.
Figure 32:
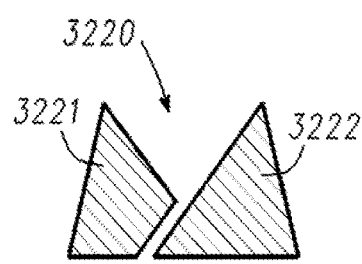
FIG. 32 depicts a cross-sectional view of an insert, according to another embodiment.

In a further illustrated embodiment, FIG. 11 depicts a cross-sectional view of channel 1110 of a golf club head, and FIG. 12 depicts a cross-sectional view of insert 1220. FIG. 13 depicts a cross-sectional view of insert 1220 located within channel 1110. This embodiment is also similar to the embodiment of FIGS. 2-4. The embodiments of FIGS. 8-10 and FIGS. 11-13, however, can more securely hold their respective inserts in their respective channels than the embodiment of FIGS. 2-3 because of the configurations of channel 810 in FIG. 8 and channel 1110 in FIG. 11. For example, the opening of channel 810 (FIG. 8) at front face 111 is narrower than a bottom of channel 810, and the opening of channel 1110 (FIG. 11) at front face 111 is also narrower than a bottom of channel 1110. Correspondingly, a top of insert 920 (FIG. 9) is narrower than a bottom of insert 920, and a top of insert 1220 (FIG. 12) is narrower than a bottom of insert 1200. In a different embodiment, insert 1220 in FIG. 12 can be replaced with insert 3220 in FIG. 32. Insert 3220 (FIG. 32) is similar to insert 1220 (FIG. 12), except that insert 3220 comprises two pieces, namely, insert 3221 and 3222 (FIG. 32). The use of insert 3220 (FIG. 32), instead of insert 1220 (FIG. 12), in channel 1110 (FIG. 11) can facilitate the insertion of the insert into the channel.

Figure 14:
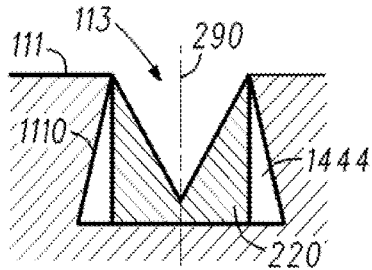
FIG. 14 depicts a cross-sectional view of the insert of FIG. 4 located within the channel of FIG. 11, according to fifth embodiment.

Next, FIG. 14 depicts a cross-sectional view of insert 210 of FIG. 4 located within channel 1110 of FIG. 11, according to another embodiment. This embodiment is also similar to the embodiment of FIGS. 2-4. In the embodiment of FIG. 14, however, the cross-sectional area of channel 1110 is greater than the sum of the cross-sectional areas of insert 220 and groove 113. In particular, the cross-sectional area of channel 1110 is greater than the sum of the cross-sectional areas of insert 220 and groove 113 by a cross-sectional area of one or more gaps or residual regions 1444. In this embodiment, an adhesive can be disposed in channel 1110, and at least a portion of the adhesive can be located within residual regions 1444. The presence of residual regions 1444 permits the use of more adhesive in this embodiment of FIG. 14 than in the embodiment of FIGS. 2-4 and other embodiments. The use of more adhesive can more securely hold insert 220 within channel 1110. As an example, a portion of residual regions 1444 can have a width of approximately 0.3 mm to 0.1 mm. In this embodiment, the adhesive can be an epoxy.

Figure 15:
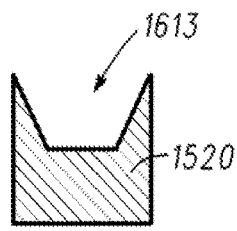
FIG. 15 depicts a cross-sectional view of another insert for the channel of FIG. 3, according to a sixth embodiment.
Figure 16:
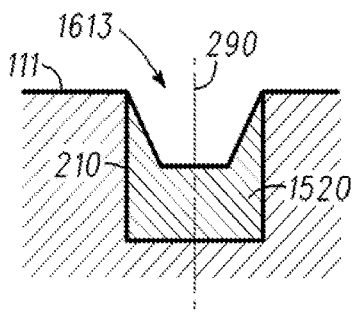
FIG. 16 depicts a cross-sectional view of the insert of FIG. 15 located within the channel of FIG. 3.

Turning to a different embodiment, FIG. 15 depicts a cross-sectional view of insert 1520, and FIG. 16 depicts a cross-sectional view of insert 1520 located within channel 210 of FIG. 3. This embodiment is also similar to the embodiment of FIGS. 2-4, but in the embodiment of FIGS. 15-16, groove 1613 is shallower than groove 113 in FIGS. 2-4.

Figure 17:
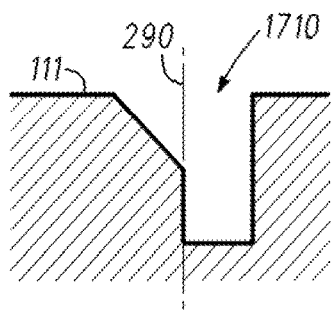
FIG. 17 depicts a cross-sectional view of a channel of a golf club head, according to a seventh embodiment.
Figure 19:
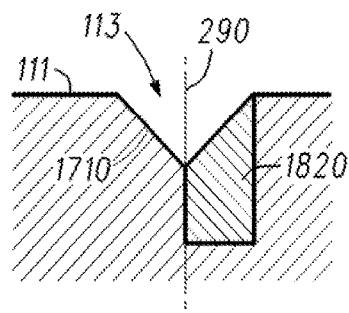
FIG. 19 depicts a cross-sectional view of the insert of FIG. 18 located within the channel of FIG. 18.

FIG. 17 depicts a cross-sectional view of channel 1710 of a golf club head, according to a further embodiment, and FIG. 18 depicts a cross-sectional view of insert 1820 in this embodiment. FIG. 19 depicts a cross-sectional view of insert 1820 located within channel 1710. This embodiment is similar to the embodiment of FIGS. 2-4, but many differences between these two embodiments also exist. For example, in FIGS. 17-19, channel 1710 and insert 1920 are asymmetric about axis 290. Also, a portion of channel 1720 forms a portion of groove 113, and a portion of insert 1920 forms a different portion of groove 113. In one example of the illustrated embodiment of FIG. 19, an adhesive is used to couple insert 1820 to channel 1710.

In this embodiment, insert 1820 can comprise a harder or softer material than strike face 111 of the golf club head body that forms channel 1710. For example, if a first edge of groove 113 that is closer to the sole of the golf club head body typically wears faster than a second edge of groove 113 that is closer to the top rail of the golf club head body, then insert 1820 can be located at the first edge of groove 113 and can comprise a harder material than strike face 111. In this example, the first and second edges of groove 113 can wear more evenly with respect to each other. In a different example, if the first edge of groove 113 typically wears slower than the second edge of groove 113, then insert 1820 can still be located at the first edge of groove 113 if insert 1820 comprises a softer material than the strike face. Other variations are also possible.

Figure 20:
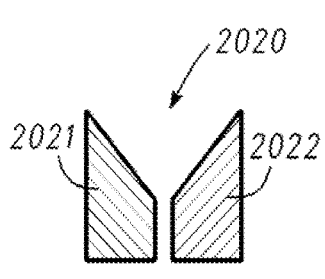
FIG. 20 depicts a cross-sectional view of another insert for the channel of FIG. 3, according to an eighth embodiment.
Figure 21:
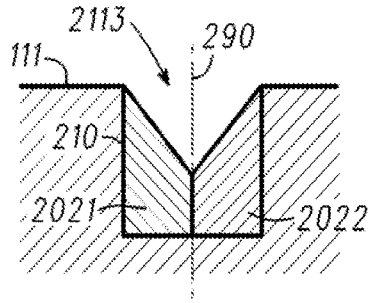
FIG. 21 depicts a cross-sectional view of the insert of FIG. 20 located within the channel of FIG. 3.

Referring to the next embodiment, FIG. 20 depicts a cross-sectional view of insert 2020, and FIG. 21 depicts a cross-sectional view of insert 2020 located within channel 210 of FIG. 3. This embodiment is also similar to the embodiment of FIGS. 2-4, but in FIGS. 20-21, insert 2020 comprises two pieces or inserts 2021 and 2022. In the embodiment of FIGS. 20-21, each piece of insert 2020 forms a different portion of groove 2113. Groove 2113 can be shallower than groove 113 in FIGS. 2 and 3. In a different embodiment, insert 2020 can comprise three or more pieces, and each piece of insert 2020 can form a portion of groove 2113. In another embodiment, insert 2020 can comprise two or more pieces, and one or more of the pieces of insert 2020 forms groove 2113 while one or more other pieces of insert 2020 do not form a portion of groove 2113. As another variation, one or more portions of the channel can also form a portion of the groove. Furthermore, the different pieces of insert 2020 can comprise the same material or can comprise different materials. For example, for reasons similar to those explained with reference to the previous embodiment of FIGS. 17-19, insert 2021 can comprise a first material, and insert 2022 can comprise a second material that is harder than the first material. In one example of the illustrated embodiment in FIG. 21, an adhesive can be used to couple inserts 2021 and 2022 to channel 210.

Figure 22:
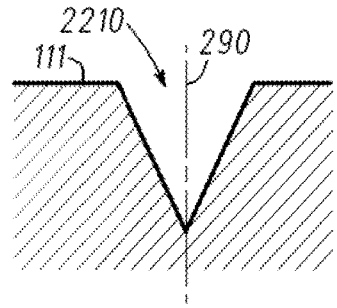
FIG. 22 depicts a cross-sectional view of a channel of a golf club head, according to a ninth embodiment.
Figure 23:
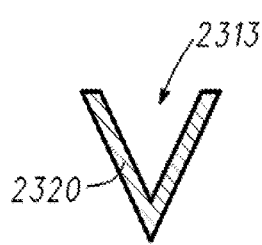
FIG. 23 depicts a cross-sectional view of an insert for the channel of FIG. 22.
Figure 24:
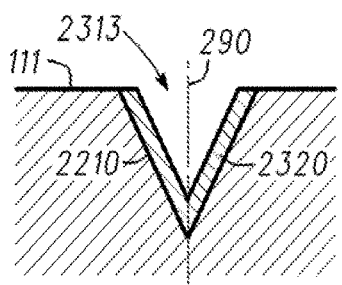
FIG. 24 depicts a cross-sectional view of the insert of FIG. 23 located within the channel of FIG. 22.

Next, FIG. 22 depicts a cross-sectional view of channel 2210 of a golf club head, according to another embodiment, and FIG. 23 depicts a cross-sectional view of insert 2320 in this embodiment. FIG. 24 depicts a cross-sectional view of insert 2320 located within channel 2210. This embodiment is also similar to the embodiment of FIGS. 2-4, but in the embodiment of FIGS. 22-24, groove 2313 comprises a cross section that can be substantially proportional to a cross section of channel 2210. In one example of the illustrated embodiment of FIG. 24, an adhesive can be used to couple insert 2320 to channel 2210.

Figure 25:
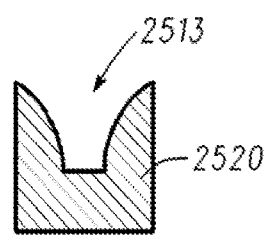
FIG. 25 depicts a cross-sectional view of another insert for the channel of FIG. 3, according to a tenth embodiment.
Figure 26:
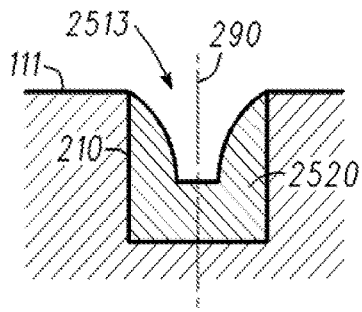
FIG. 26 depicts a cross-sectional view of the insert of FIG. 25 located within the channel of FIG. 3.
Figure 27:
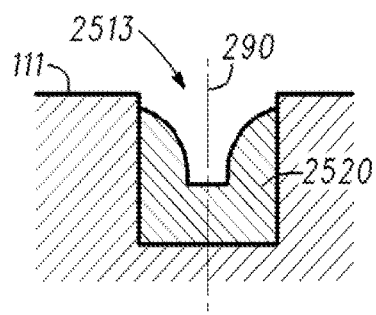
FIG. 27 depicts a cross-sectional view of the insert of FIG. 25 located within the channel of FIG. 3 after the insert is worn down, according to an eleventh embodiment.

FIG. 25 depicts a cross-sectional view of insert 2520 according to another embodiment, and FIG. 26 depicts a cross-sectional view of insert 2520 located within channel 210 of FIG. 3. This embodiment is also similar to the embodiment of FIGS. 2-4, but as illustrated in FIGS. 25-26, groove 2513 has a different shape than groove 113 in FIGS. 2 and 4. In one embodiment of FIGS. 25-26, among other embodiments, the material used for insert 2520 can be softer than the material used for strike face or front face 111. In this embodiment, FIG. 27 depicts a cross-sectional view of insert 2520 after being worn down such that the edges of grooves 2513 can become sharper as an individual uses the golf club more. In another embodiment, an upper portion of insert 2520 can comprise a softer material than a lower portion of insert 2520 to better control the amount of "wearing down" that insert 2520 will exhibit over time. As an example, the harder material of the lower portion of insert 2520 can be similar to the material used for front face 111, or the harder material of the lower portion of insert 2520 can be a different material that is either harder or softer than the material used for front face 111. Furthermore, insert 2520 can be divided into two or more pieces, similar to the embodiment illustrated in FIGS. 20 and 21 for reasons similar to those discussed with respect to FIGS. 20-21 and/or FIGS. 17-19.

Figure 28:
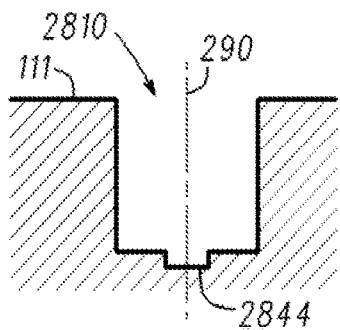
FIG. 28 depicts a cross-sectional view of a channel of a golf club head, according to a twelfth embodiment.
Figure 29:
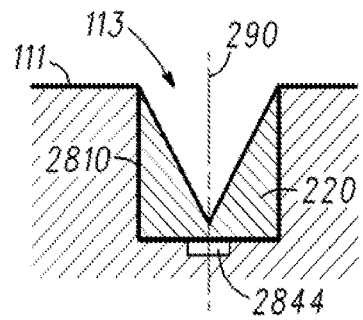
FIG. 29 depicts a cross-sectional view of the insert of FIG. 4 located within the channel of FIG. 28.
Figure 30:
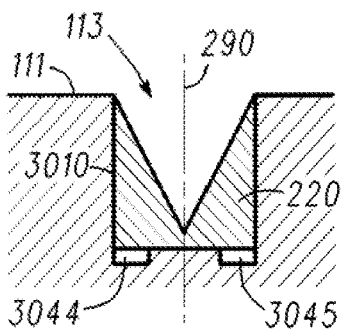
FIG. 30 depicts a cross-sectional view of the insert of FIG. 4 located within a different embodiment of the channel of FIG. 28.

FIG. 28 depicts a cross-sectional view of channel 2810 of a golf club head, according to another embodiment, and FIG. 29 depicts a cross-sectional view of insert 220 of FIG. 4 located within channel 2810. This embodiment is similar to the embodiment of FIGS. 2-4, but as illustrated in FIG. 29, a gap or residual region 2844 exists in channel 2810 after insert 220 is inserted into channel 2810, which is similar to the embodiment of FIG. 14. FIG. 30 depicts a cross-sectional view of insert 220 of FIG. 4 located within channel 3010, which is a different embodiment of channel 2810 in FIGS. 28 and 29. One or more gaps or residual regions 3044 and 3045 exist in channel 3010 after insert 220 is inserted into channel 3010.

Figure 31:
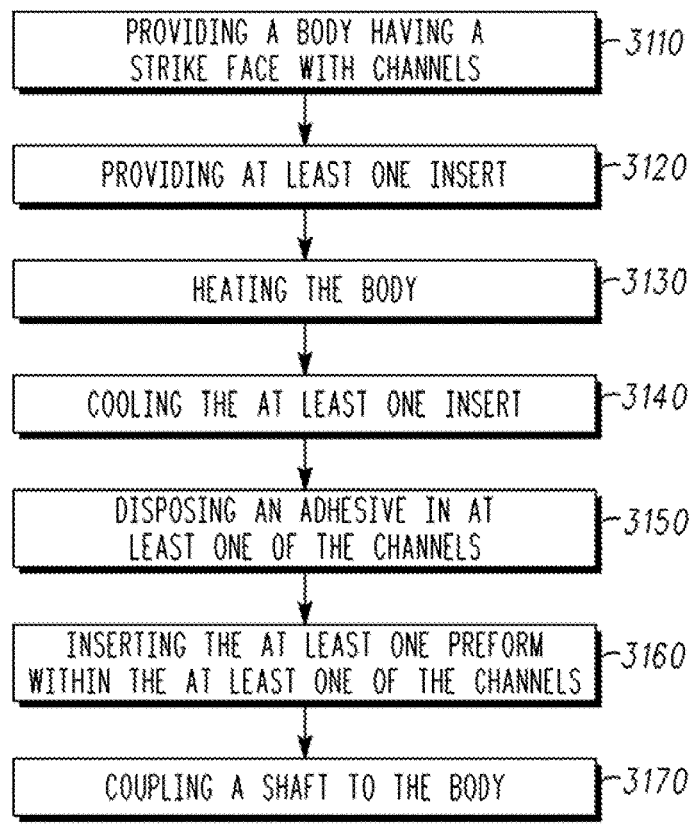
FIG. 31 depicts a flow chart of a method of manufacturing a golf club according to a further embodiment.

FIG. 31 depicts flow chart 3100 of a method of manufacturing a golf club according to a further embodiment. As an example, the golf club of flow chart 3100 can be similar to golf club 100 in FIG. 1. Flow chart 3100 includes providing a body having a strike face with channels (block 3110). As an example, the body of block 3110 can be similar to golf club head body 110 in FIG. 1, and the strike face and channels of block 3110 can be similar to front face 111 and channel 210 in FIGS. 2 and 3. The channels of block 3110 can also be similar to the other channels described herein.

In one embodiment of block 3110, the body can be cast, forged, or machined. In the same or different embodiment of block 3100, the strike face of the golf club head body can have one or more channels, and at least one of the channels can be symmetrical or non-symmetrical. The other variations of the body, strike face, and channel(s) described above in FIGS. 1-30 can also be part of block 3110.

Flow chart 3100 also includes providing at least one preform or insert (a block 3120). As an example, the at least one preform or insert of block 3120 can be similar to insert 220 of FIGS. 2 and 4. The preform(s) or insert(s) of block 3120 can also be similar to the other preforms and inserts described herein. The sequence of blocks 3110 and 3120 can be reversed.

The preform(s) and insert(s) can be extruded, cast, forged, injected, deposited (i.e., vapor deposition, sputtering, etc.), or machined. In one embodiment, the preform(s) or insert(s) are extruded from aluminum. In this embodiment, block 3120 can include providing the preform(s) or insert(s) to comprise a different material from the material of the strike face. In a different embodiment, block 3120 can include providing the preform(s) or insert(s) to comprise the same material as the strike face.

In the same or different embodiment, the preform(s) or insert(s) of block 3120 can have a size that is larger than a size of the channels (block 3110) into which the preform(s) or insert(s) are inserted. In one embodiment, the preform(s) or insert(s) can have a width that is slightly larger than the width of the channels. For example, the channels can have a substantially constant width of approximately 0.2 mm to 0.010 mm. In this example, a bottom of the insert(s) can have approximately the same width as the width of the channels, but the width of the insert(s) can taper outwardly by approximately 0.5-2.0 degrees (in one embodiment) to slightly and/or gradually increase the width of the insert(s) from the bottom of the insert(s) to the top of the insert(s). Both sides of the insert(s) can be tapered, or only one side of the insert(s) can be tapered. In another example, the insert(s) can have a substantially constant width, and the bottom of the channels can have approximately the same width as the width of the insert(s), but the width of the channels can taper inwardly by approximately 0.5-2.0 degrees (in one embodiment) to slightly and/or gradually decrease the width of the channels from the bottom of the channels to the top of the channels. Both sides of the channels can be tapered, or only one side of the channels can be tapered. In a further example, the insert(s) can taper outwardly from bottom to top, and the channels can taper inwardly from bottom to top. In another example, one or more of the length and width of the inserts and/or the channels is tapered. In a further embodiment, one or more of the length and width of the inserts is not tapered, but is slightly larger than the corresponding length and/or width of the channels by a magnitude that is similar to what is described above for the tapered embodiment. The other variations of the insert(s) and preform(s) described above in FIGS. 1-30 can also be part of block 3120.

Flow chart 3100 continues with an optional heating of the body (optional block 3130) and an optional cooling of the insert(s) or preform(s) (optional block 3140). The sequence of blocks 3130 and 3140, if used in flow chart 3100, can be reversed. In a different embodiment, only one of blocks 3130 and 3140 or none of blocks 3130 or 3140 is used in flow chart 3100.

As an example where the channel length is more than three times the channel width, the body and/or strike face can be heated to a temperature of approximately thirty-five to one hundred fifty degrees Celsius above room temperature in block 3130, or cooled to a temperature of approximately thirty-five to one hundred fifty degrees Celsius (° C.) below room temperature in block 3140. More specifically, in one embodiment where the strike face comprises 17:4 stainless steel (i.e., 17 percent (%) chromium and 4% nickel) and where the insert comprises tungsten carbide, the strike face can be heated to a temperature of approximately 100-150° C. above room temperature. In another embodiment where the strike face comprises 17:4 stainless steel and where the insert comprises aluminum, the strike face can be heated to a temperature of approximately 35-100° C. above room temperature, and the insert can be cooled to a temperature of approximately 5-50° C. below room temperature. In a further embodiment where the strike face comprises 17:4 stainless steel and where the insert comprises stainless steel, the strike face can be heated to a temperature of approximately 35-100° C. above room temperature, and the insert can be cooled to a temperature of approximately 35-100° C. below room temperature. In these examples, the width of the insert or preform can be the same as or slightly larger than the width of the channel while the length of the insert and the channel remain approximately the same. Also in these examples, the insert or preform can be a single piece or multiple pieces. One or more of blocks 3130 and 3140 can be particularly useful for the embodiments of FIGS. 8-10, FIGS. 11-13, and any of the embodiments with a friction fit.

Flow chart 3100 also includes an optional disposing of an adhesive in the channel(s) (optional block 3150). As an example, the adhesive of block 3150 can be similar to the adhesive described with respect to FIGS. 2-4. If used in flow chart 3100, block 3150 can occur before, after, or during, one or more of blocks 3130 and 3140.

Next, flow chart 3100 continues with inserting the preform(s) within the channel(s) (block 3160). When blocks 3130 and 3140 are used, block 3160 occurs during or after blocks 3130 and 3140. When block 3130 is used, block 3160 can include inserting the insert(s) or preform(s) within the channel(s) before the body cools down to room temperature. When block 3140 is used, block 3160 can include inserting the insert(s) or preform(s) within the channel(s) before the body warms up to room temperature. The preform(s) can be secured within the channel(s) by using a friction fit regardless of whether block 3150 is used in flow chart 3100.

In some embodiments, after block 3160, the channel(s) comprise a single groove, and the insert(s) or preform(s) form at least a portion of the single groove. Also, as explained above, the single groove can be symmetrical.

Flow chart 3100 also includes coupling a shaft to the body (block 3170). As an example, the shaft of block 3170 can be similar to shaft 120 of FIG. 1. Block 3170 can occur before, after, or during any of blocks 3120, 3130, 3140, 3150, and 3160.

Although golf club heads with grooves and methods of manufacture thereof have been described with reference to specific embodiments, various changes may be made without departing from the scope of the golf club head with grooves and related methods. Various examples of such changes have been given in the foregoing description. As another example, the shapes and configurations of the channels, inserts, and grooves can vary from the specific shapes and configurations disclosed herein. For instance, the configuration of the channels and inserts can be designed to keep the insert within the channel when a golf ball impacts the strike face, such as where the channel has curved sidewalls and where the insert has complementarily curved sidewalls. As a further example, a golf club head can have more than one shape or configuration of channels and/or inserts while having substantially constant or uniform grooves. Moreover, one or more of the features of one or more embodiments disclosed herein can be combined with some or all of the features of a different embodiment disclosed herein. Accordingly, the disclosure of embodiments is intended to be illustrative of the scope of the application and is not intended to be limiting. It is intended that the scope of this application shall be limited only to the extent required by the appended claims. Therefore, the detailed description of the drawings, and the drawings themselves, disclose at least one preferred embodiment of a golf club head with grooves and methods of manufacture thereof, and may disclose alternative embodiments of the same.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A golf club head comprising:
    a body having a strike face with a plurality of channels;
    wherein the strike face comprises a first material;
    wherein the plurality of channels are formed within the first material such that each channel is separated from other channels by the first material; and
    at least one insert located entirely within at least one channel of the plurality of channels;
    wherein:
    the at least one channel comprises a single groove;
    the at least one insert forms at least a portion of the single groove;
    a radius of each exterior edge of the single groove is partially formed by the at least one insert and is also partially formed by the strike face;
    wherein the at least one channel of the plurality of channels comprises a first cross section;
    the single groove comprises a second cross section;
    the first cross section comprises a first cross-sectional area;
    the second cross section comprises a second cross-sectional area; and
    the second cross-sectional area is substantially proportional to the first cross-sectional area the at least one insert comprises a second material;
    wherein the first material is different from the second material.

2. The golf club head of claim 1, wherein an adhesive is used to couple the at least one insert to the at least one channel.

3. The golf club head of claim 1, wherein the first material comprises any one or combination of the following materials: stainless steel, titanium, graphite, or a composite of metallic and non-metallic materials.

4. The golf club head of claim 1, wherein the second material comprises any one or combination of the following materials: aluminum, resin, plastic, titanium, or stainless steel.

5. The golf club head of claim 1, wherein the second material is softer than the first material.

6. The golf club head of claim 1, wherein the second material wears faster than the first material.

7. The golf club head of claim 1, wherein the at least one channel is symmetrical about a first axis;
    the single groove is symmetrical about the first axis; and
    the first axis is substantially perpendicular to a width of the at least one channel.

8. The golf club head of claim 1, wherein a top of the at least one insert is wider than a bottom of the at least one insert.

9. A golf club head comprising:
    a golf club head having a strike face with channels;
    a first preform located entirely within a first one of the channels and substantially planar with the strike face;
    a second preform located entirely within a second one of the channels and substantially planar with the strike face;
    a shaft coupled to the golf club head,
    wherein:
    each of the first and second ones of the channels comprises a single groove;
    the first preform forms a first part of the single groove in the first one of the channels;
    the second preform forms a first part of the single groove in the second one of the channels;
    a first edge of the strike face is located adjacent to the first one of the channels;
    a second edge of the strike face is located adjacent to the second one of the channels;
    a radius of each exterior edge of the single groove of the first one of the channels is partially formed by the strike face and is also partially formed by the first preform;
    the second edge of the strike face forms a second part of the single groove in the second one of the channels;
    a radius of each exterior edge of the single groove of the second one of the channels is partially formed by the strike face and is also partially formed by the second preform;
    the first one of the channels comprises a first cross section across a width of the first one of the channels;
    the single groove of the first one of the channels comprises a second cross section across a width of the single groove of the first one of the channels;
    the second one of the channels comprises the first cross section across a width of the second one of the channels;
    the single groove of the second one of the channels comprises the second cross section across a width of the single groove of the second one of the channels;

the first cross section comprises a first cross-sectional area;

the second cross section comprises a second cross-sectional area; and the second cross-sectional area is substantially proportional to the first cross-sectional area the strike face comprises a first material;

the first perform and the second preform comprise a second material;

wherein the first material is different than the second material.

10. The golf club head of claim 9, wherein the second material wears faster than the first material.

11. The golf club head of claim 9, wherein the second material comprises any one or combination of the following materials: aluminum, resin, plastic, titanium, or stainless steel.

12. The golf club head of claim 9, wherein the first material comprises any one or combination of the following materials: stainless steel, titanium, graphite, or a composite of metallic and non-metallic materials.

13. The golf club head of claim 9, wherein the first one of the channels is symmetrical about a first axis;

the single groove of the first one of the channels is symmetrical about the first axis; and the first axis is substantially perpendicular to a width of the first one of the channels.

14. The golf club head of claim 9, wherein the first preform is not located above a top surface of the strike face.

15. The golf club head of claim 9, wherein a top of the first preform is wider than a bottom of the first preform.

16. The golf club head of claim 9, wherein an adhesive couples the golf club head and the first preform together, wherein:

a gap is located between the first one of the channels and the first preform; and the adhesive is located at least partially in the gap.

* * * * *